United States Patent [19]
Smith et al.

[11] 3,834,578
[45] Sept. 10, 1974

[54] FLOWED-IN POLYURETHANE GASKETS FOR PAIL AND DRUM COVERS

[75] Inventors: David B. Smith, Watertown; Joel A. Gribens, Framingham, both of Mass.

[73] Assignee: W. R. Grace & Co., Cambridge, Mass.

[22] Filed: June 22, 1972

[21] Appl. No.: 265,148

[52] U.S. Cl. ........... 220/46 R, 215/40, 260/2.5 AK, 260/2.5 AM, 260/2.5 BE, 260/77.5 AM, 260/859
[51] Int. Cl... B65d 53/06, C08g 22/48, C08g 41/04
[58] Field of Search ........ 260/2.5 BE, 2.5 AM, 859, 260/77.5 AM; 220/46 R; 215/40

[56] References Cited
UNITED STATES PATENTS

| | | | |
|---|---|---|---|
| 3,273,743 | 9/1966 | McColl | 220/46 R |
| 3,389,113 | 6/1968 | Simons | 215/40 |
| 3,427,366 | 2/1969 | Verdol | 260/859 R |
| 3,564,602 | 2/1971 | Peck | 215/40 |
| 3,635,908 | 1/1972 | Vogt | 260/2.5 AM |
| 3,687,332 | 8/1972 | Westfall | 220/46 R |

OTHER PUBLICATIONS

"Poly B-D Liquid Resins," Product Data Bulletin No. 505, Sinclair Petrochemicals, Inc., May 1, 1965, pages 1 to 3 of table of contents, pp. 1 to 3, pp. 20 to 23, pp. 31, 32, 39 to 42 and 44 to 46.

Primary Examiner—Donald E. Czaja
Assistant Examiner—C. Warren Ivy
Attorney, Agent, or Firm—Armand McMillan; C. E. Parker

[57] ABSTRACT

Superior sealing performance can be imparted to pail and drum covers by equipping them with flowed-in gaskets made from a composition comprising a nitrile rubber, a polyurethane prepolymer and a carbon dioxide blocked polyamine curing agent.

1 Claim, No Drawings

FLOWED-IN POLYURETHANE GASKETS FOR PAIL AND DRUM COVERS

THE PRIOR ART

The manufacture of gasketed or sealed closure members for containers, such as metal pail covers and metal drum covers, generally involves, on a practical basis, machinery capable of placing annular layers of sealing compound upon the closure members at a high rate of speed. Once this has been done, the closure member with its liquid gasket is subjected to an appropriate heat treatment, or to moisture as the case may be, to effect the cure of the composition to the desired extent.

For these reasons, the provision of fast-curing sealing compounds to the container closure industry is highly desirable. Yet, keeping in mind the exacting requirements of a good compound for high speed application, none of the known polymeric materials stands out a priori for selection in terms of storage stability, one-package convenience, appropriate low shear and high shear viscosity for ease of application, quick controlled cure and satisfactory gasket properties.

Polyurethanes, for example, provide a good illustration of the expectations of the man skilled in the art with respect to the use presently contemplated. Thus, although polyurethane elastomers have found wide use because of their excellent properties, there exists a problem in the matter of curing agents. Most typically used for this purpose are polyols, water and polyamines. With polyols or water, the cure is relatively slow and, even with heat, no obvious advantage is obtained over the rubber compositions of the art. Furthermore the shelf life of these prepolymers is seriously shortened in the presence of these curing agents. When polyamines are selected as curing agents, on the other had, the reaction is either so fast as to be of no practical significance, as in the case of the lower diamines, or in any event serious problems of stability are encountered which preclude the use of one-package compositions due to the short shelf life of fully compounded materials. As to the use of masked or blocked polyamines, it has been found (U.S. Pat. No. 3,513,125) that the cure proceeds rather slowly after the initiation of crosslinking, not to mention the undesirability of released acidic blocking agents in a metal-container medium. Part of these potential difficulties may, of course, be avoided by the use of polyamine carbonates as blowing agents. In such compounds the acid moiety is an asset rather than a detriment. But the carbonates, which are formed with carbon dioxide in the presence of water.

are difficult to use because, when compounded with polyurethane prepolymers, they require relatively long heating periods at elevated temperatures in order to cure. Thus, a one-mil thick layer of castor oil-toluene diisocyanate prepolymer mix with the carbonate of triethylenediamine requires a cure of 30 minutes at 302°F (U.S. Pat. No. 3,425,964). The projection of these parameters to gaskets with thicknesses of twenty mils or more is certainly not very encouraging. Neither, for that matter, is the alternative of substituting for the carbonates their conventional equivalents, the polyamine carbamates. Yet, this is what applicants have done, and with unexpected success if one considers that all the shortcomings of the carbonates can be attributed a priori to the carbamates.

The blocked curing agents that applicant has found essential for the process of this invention are well known to the art and their preparation is fully described in various publications, including U.S. Pat. Nos. 3,029,227 and 3,344,175. They are prepared in a manner similar to the carbonates with the exception that water is excluded from the reaction mixture:

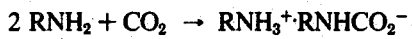

For a diamine, the reaction becomes:

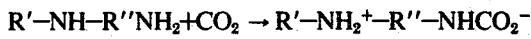

The product is a stable "inner salt" which can be dispersed in well known fluid isocyanate-terminated polyalkylene ether or polyester prepolymers to form remarkably stable gasket-lining compounds ready for application to closure members without further handling. Once applied and heated for a short time, the carbamate decomposes into the original polyamine and carbon dioxide. The liberated polyamine reacts with the isocyanate groups of the prepolymer to form urea linkages, while the released carbon dioxide serves as a foaming agent. The overall process is quite rapid.

SUMMARY OF THE INVENTION

It has now been discovered that flowed-in gaskets can be lined on pail and drum covers from a composition comprising a nitrile rubber, a polyurethane prepolymer and a carbon dioxide-blocked polyamine, to yield, after quick curing, gaskets with outstanding sealing qualities and excellent recovery after dry compression.

DETAILED DESCRIPTION

The compositions of this invention consist essentially of a mixture of low molecular weight polyurethane prepolymer with a nitrile rubber and a finely dispersed polyamine carbamate. Fillers, solvents, antioxidants, pigments and other additives may be incorporated for their conventional effects.

The polyurethane prepolymers usable in this invention are low molecular weight reaction products of polyisocyanates, preferably aromatic, with polyfunctional organic compounds containing active hydrogen. Polyhydroxy compounds are preferred, the best results having been obtained with mixtures of triols and diols in which the ratio of triol hydroxyl groups to the total number of hydroxyl groups in the prepolymer is in the vicinity of about 0.04.

The nitrile rubber used in the present compositions preferably has a "high acrylonitrile" content, i.e., about 38 to 42 percent. Other acrylonitrilebutadiene rubbers may also be used, but with attendant changes in the properties of the final gaskets. The composition of the invention should contain between 10 and 30 percent by weight of nitrile rubber, based on the polyurethane prepolymer content.

The carbamates to be employed with the prepolymers already enumerated are, as already mentioned, the reaction products of polyamines and carbon dioxide under anhydrous conditions. The compounds so prepared are generally stable solid materials which may be pulverized for dispersion into the polyurethane prepolymer or dispersed in an organic non-aqueous inert solvent prior to admixture with said prepolymer. The preferred particle size of the carbamate for mechanical stability of the prepolymer mix and the uniformity of the cured polyurethane mass is such that the powder should pass through a 200 mesh or finer U.S. Bureau of Standards screen. Typical examples of usable carbamates are provided in U.S. Pat. Nos. 3,029,227 and 3,344,175.

The polyamines that are useful in the formation of the protected curing agent are those di-, tri-, tetra-, and other polyamines having at least one active hydrogen atom for each amine group in order that the amine group be capable of combining with carbon dioxide to form the carbamate. The presence of active hydrogen atoms is necessary for the subsequent reaction with the prepolymer. The polyamines having primary and secondary groups readily combine at about room temperature (72°F) with carbon dioxide.

The preferred amines are those compounds containing terminal amino groups. Illustrative species are: 1,2-butanediamine; propylenediamine; 1,3-propane diamine; N,N'-dimethyl-1,3-propane diamine; N,N'-diethyl-1,3-propanediamine; 1,4-butanediamine; 1,6-hexanediamine; ethylene diamine; N-allylethylenediamine; cadaverine; putrescine; pentaethylenehexamine; hexaethyleneheptamine and heptaethyleneoctamine. Other useful polyamines are 3,8-diaza-1,10-decanediamine; triethylenetetramine; 1,4-bis(1,3-diaminopropyl)-n-butane; 1,3,5,7-heptanetetramine; tetraethylenepentamine; diethylenetriamine; 3,3'-diamino-dipropylamine; and 1,3,6-hexanetriamine.

Subject to the preferences already expressed in terms of prepolymers, i.e., partial reaction products of aromatic diisocyanates with mixtures of diols and triols, such as polyalkylene glycols, and polyhydroxy polyethers, such as polypropylene oxide adducts of hexane triol, there may be used other polyisocyanates and polyhydroxy compounds to achieve useful, if not optimum properties in the gaskets.

Among the polyisocyanates that may be employed in this manner are: the various unsubstituted phenylene diisocyanates, as well as those having one or more substituents such methyl and other lower alkyl groups having up to about 4 carbon atoms, halogen atoms, nitro groups, alkoxy and aryloxy groups; various substituted and unsubstituted biphenylene diisocyanates; substituted and unsubstituted diphenyl diisocyanates such as the diphenylmethanes-, the diphenylisopropylidenes- and the diphenylsulfone diisocyanates; the naphthalene diisocyanates; alkylene diisocyanates containing up to about 10 alkylene carbon atoms; cycloalkyl diisocyanates containing one or more cycloalkane rings such as 1,3-cyclopentene- and 4,4'-dicyclohexylmethane diisocyanate; and other diisocyanates such as 1-ethyleneisocyanato-4-phenylisocyanate. Examples of tri- and tetra- isocyanates that may be used include the benzene and toluene triisocyanates, 2-methyl-2-(4-isocyanatophenyl)-trimethylene diisocyanate, tetrakis-(4-isocyanatophenyl)methane and bis-(4-methyl-2,5-isocyanatophenyl)methane. Polymeric materials such as polymethylene polyphenylisocyanate may also be employed.

Suitable compounds that will react with the above isocyanates to yield the necessary prepolymers include polyols such as ethylene glycol, glycerol, pentaerythrytol, sorbitol, triethanolamine, as well as polymeric compounds such as polyglycols, polyhydroxy polyesters, polyhydroxy polyesteramides and polyhydroxy polyether oils.

Typical polyglycols include polyalkylene glycols, such as polyethylene glycol, polypropylene glycol, and polybutylene glycol.

Representative polyesters are reaction products of dihydric alcohols, such as ethylene glycol, diethylene glycol, tetraethylene glycol, 1,3-propylene glycol, dipropylene glycol, or higher polyhydric alcohols such as glycerol, trimethylol propane, pentaerythritol, mannitol, or mixtures of two or more of the alcohols with a polycarboxylic acid or anhydride such as succinic, adipic, glutaric, malonic, sebacic, azelaic, phthalic, terephthalic, isophthalic, trimellitic and pyromellitic acids and their anhydrides. Mixtures of the acids and anhydrides can be employed.

Illustrative polyhydroxyl polyesteramides are the reaction products of a polyhydric alcohol with a dicarboxylic acid, examples of both of which have been mentioned above, and as necessary, diamines or aminoalcohols such as ethylene diamine, hexamethylene diamine, phenylene diamine, benzidine and monoethanolamine.

Examples of polyhydroxy polyethers include linear hydroxyl-containing polymers and copolymers of cyclic ethers such as ethylene oxide, epichlorohydrin, 1,2-propylene oxide, oxacyclobutane, and tetrahydrofuran, or branched polyethers obtained from the condensation of the aforementioned ethers with branched polyhydroxy compounds such as glycerol, 1,1-trimethylolpropane, pentaerythritol, sorbitol and sucrose. Mixtures of linear and branched polyethers or mixtures of polyesters and polyethers can also be employed.

Other polyhydroxyl materials, for example, esters of hydroxycarboxylic acids, such as castor oil and glyceryl monoricinoleate, can also be used.

The solid polyurethane polyurea which results from the curing of the sealing compositions of interest may be crosslinked to any degree desired, depending on the number of functional groups present and the ratio of amino groups to isocyanate groups.

Satisfactory crosslinking of the polymers used in this invention is generally achieved with terminal isocyanate group to carbamate chemical equivalent ratios within the range of 1.15:1 to 1:1.30. These proportions may also vary more broadly depending on the particular nature of the components used and the degree of crosslinking required by the application intended for resulting polymer.

The temperature at which the polyurethane foam is formed depends upon the nature of the prepolymer used and the decomposition temperature of the carbamate. Although a temperature of about 150°F can be used, the range of 200°F to 300°F is generally preferred. At 300°F, for instance, most compositions foam to a uniform cell structure in as little as 2 minutes for a foam thickness of about 0.25 inches.

The compositions of the invention will generally contain a solvent to facilitate handling of the prepolymer mix by gasket-laying machinery. Such solvents are organic liquids that do not possess any active hydrogen to react with the isocyanate groups of the polymer and are capable of evaporating under process conditions. Examples of suitable liquids for this purpose include: aromatic hydrocarbons, such as benzene, toluene and xylene; acetic esters, such as ethyl and butyl acetates; chlorinated aromatic and aliphatic solvents, such as monochlorobenzene and carbon tetrachloride; ethers, such as butyl ethyl ether, dioxane and hydrofuran; and ethylene glycol monomethyl ether acetate. Solvents having active hydrogen such as the lower alchohols, may be used to prepare the carbamate, if that is done, but they must be removed from the dispersion before it is mixed with the prepolymer.

Conventional plasticizers may also be incorporated into the compositions used in the practice of the invention, the preferred materials being phthlate esters. Examples of these materials, which may be used with or in lieu of a solvent, are dioctyl phthalate, diisodecyl phthalate and the like.

As fillers, when such are desired, there may be used, for example, calcium carbonate, calcium silicate, aluminum silicate, silica, chrysolite asbestos, carbon black, titanium dioxide, fully calcined clays and talcum powder.

The following examples are provided to illustrate the invention. All parts and precentages therein are on a weight basis, unless otherwise specified.

EXAMPLE 1

A polyurethane-nitrile rubber gasket composition is prepared from the following ingredients:

| Material | Parts by Weight |
| --- | --- |
| Polyoxypropylene glycol, M.W. 2000 average | 28.18 |
| Hexanetriol, polypropylene oxide adduct, M.W. 2500 average | 3.31 |
| Diethylene glycol | 1.66 |
| Nitrile rubber, 40% acrylonitrile | 10.44 |
| Calcium carbonate | 27.85 |
| Benzoyl chloride | 0.51 |
| Toluene diisocyanate | 14.80 |
| $CO_2$-blocked diethylene triamine | 4.46 |
| Toluene | 5.60 |
| Sodium bis-(tridecyl)sulfosuccinate | 0.68 |
| Hydrogenated castor oil | 0.11 |
| Organo-silicon copolymer surfactant | 2.38 |

The three hydroxyl group-containing compounds were mixed together and heated at 190°F for 2 hours while stirring in vacuo. The dried mixture was cooled to 80°F. The nitrile rubber, calcium carbonate and benzoyl chloride were then thoroughly dispersed into this mixture. The diisocyanate was added and the resulting mixture heated to 170°F and maintained within 167°F to 176°F for 1.5 hours. A prepolymer was thus obtained having a —NCO titer of about 5 percent, and a triol to total hydroxyl group ratio of about 0.04.

A suspension was prepared with a pulverized carbamate resulting from the treatment of diethylene triamine with carbon dioxide under anhydrous conditions. The last three ingredients, i.e., surfactants and foam stabilizers, were added to the toluene and the carbamate was mixed in. The resulting dispersion was added to the prepolymer-rubber mixture to yield the final stable, curable preparation. The organo-silicon copolymer used is a copolymer of dimethylsiloxane, ethylene oxide and propylene oxide.

EXAMPLE 2

The gasket-channel of 12-inch metal pail covers were lined by means of automatic lining machinery with an appropriate quantity of gasketing compound. The lining operation was carried out at the rate of about 40 covers per minute per lining station. The lined covers were then passed through an oven where they were allowed to reside long enough to convert the liquid gasketing compositions to fine-celled resilient non-tacky foam. The type of composition, the quantity lined, as well as the heating time and temperature, are listed in the following table.

TABLE I

| | Lined 12-inch Pail Covers | | |
| --- | --- | --- | --- |
| Type | Quantity | Time | Temperature |
| Polyurethane/NBR (Example 1) | 9 g | 20 minutes | 260°F |
| SBR Cover Compound II | 18 g | 90 minutes | 250°F |
| SBR Cover Compound III | 18 g | 90 minutes | 250°F |

The SBR cover compounds used here for comparison purpose are commercial products widely used in the container industry. These cover compounds contain about 30 percent, dry weight, of a 25:75 styrene-butadiene rubber, 60 percent calcium carbonate, as well as the usual conventional stabilizers, curing agents and surfactants in the proportions required to give them their specific characteristics. SBR Cover Compound II yields a soft deformable cured product while SBR Cover Compound III cures to a harder, less deformable substance.

The pail covers lined in the manner of Example 2 were tested for sealing capacity, resilience of gasket and resistence to various liquids.

In the first type of test, typical liquids were placed in 5-gallon pails, gasketed covers were crimped on, both lacquered and plain, and the loss of liquid on storage by diffusion through the gasket was measured by weighing after various time intervals. One set of pails was weighed at the end of 30 days of storage. These pails were then opened, resealed, and weighed again 7 days later. Another set was weighed after 60 days of storage, opened, resealed and again weighed seven days later. The losses of liquid, in pounds, which took place under these conditions are reported in Table II.

TABLE II

SOLVENT LEAKAGE TEST

| After 30 Days Gasket Compound | Solvent | Loss (lbs) | | Loss (lbs) Reclosed for 7 Additional Days | | Loss (lbs) After 60 Days | | Loss (lbs) Reclosed for 7 Additional Days | |
| --- | --- | --- | --- | --- | --- | --- | --- | --- | --- |
| | | Plain Cover | Lacquered Cover | Plain Cover | Lacquered Cover | Plain Cover | Lacquered Cover | Plain Cover | Lacquered Cover |
| Polyurethane – NBR I | ethyl alcohol | 0.00 | 0.00 | 0.00 | 0.00 | 0.00 | 0.25 | 0.15 | 0.12 |
| SBR Compound II | ethyl alcohol | 1.31 | 1.03 | 0.34 | 0.25 | 1.61 | 0.38 | 0.47 | 1.00 |
| SBR Compound III | ethyl alcohol | 0.00 | 1.07 | 0.81 | 0.67 | 0.61 | 1.50 | 1.60 | 0.83 |
| Polyuethane – NBR I | methylethyl ketone | 0.00 | 0.00 | 0.00 | 0.00 | 0.19 | 0.19 | 0.15 | 0.12 |
| SBR Compound II | methylethyl ketone | 0.00 | 0.00 | 0.00 | 0.00 | 0.00 | 0.12 | 0.15 | 0.15 |
| SBR Compound III | methylethyl ketone | 0.00 | 0.00 | 0.00 | 0.00 | 0.12 | 0.19 | 0.50 | 0.12 |
| Polyurethane – NBR I | lacquer thinner | 0.00 | 0.00 | 0.00 | 0.00 | 0.00 | 0.12 | 0.00 | 0.10 |
| SBR Compound II | lacquer thinner | 0.00 | 0.00 | 0.00 | 0.00 | 0.00 | 0.12 | 0.15 | 0.12 |
| SBR Compound III | lacquer thinner | 0.00 | 0.00 | 0.00 | 0.00 | 0.19 | 0.12 | 0.12 | 0.09 |

It becomes apparent from the results in Table II that the polyurethane gaskets (I) are superior as sealants for ethyl alcohol type of liquids, while being equal or slightly better than those of the prior art (II and III) with respect to other common organic solvents.

In the second series of tests, the gasketed covers of Example 4 were crimped on metal pails, allowed to remain there under compression for the period and at the temperature indicated. Compression was determined by measuring the thickness of the gasket at the various stages. Recovery was measured in the same manner at the times indicated.

The results of this tests are summarized in the following table.

TABLE III

DRY COMPRESSION SET
(Percent Recovery)

| Gasket Compound | 60% Compression at R.T. for 30 Days | | | 60% Compression at 100°F for 30 Days | | | 40% Compression at R.T. for 30 Days | | |
|---|---|---|---|---|---|---|---|---|---|
| | Immediate Recovery | 1 Hour Recovery | 1 Week Recovery | Immediate Recovery | 1 Hour Recovery | 1 Week Recovery | Immediate Recovery | 1 Hour Recovery | 1 Week Recovery |
| I | 91 | 97 | 100 | 90 | 100 | 100 | 85 | 99 | 100 |
| II | 77 | 79 | 86 | 75 | 77 | 85 | 73 | 76 | 90 |
| III | 85 | 89 | 96 | 82 | 84 | 90 | 83 | 88 | 91 |

I. Polyurethane – NBR I
II. SBR Cover Compound II
III. SBR Cover Compound III

The quick and superior recovery of polyurethane gaskets (I) is again apparent on comparison with the behavior of conventional gaskets (II and III). The polyurethane gaskets of this invention evidently possess a high degree of resilience.

The resistance of the various gaskets to common liquids was tested by immersing cured gasket material in a given liquid for certain periods of time and determining the loss in weight of said gasket material after complete removal of the liquid. The data of the tests carried out in this manner is summarized in Table IV.

In summary, the present invention relates to cover gaskets which not only benefit from the processing ease attending stable one-package fast-curing polyurethanes, but also perform in a superior manner under the type of conditions generally availing in their field of application. Although a number of examples have been provided here to illustrate various operational features of the invention, it is apparent that the man skilled in the art can devise several other embodiments which will be substantially within the scope of the invention as described in the appended claims.

What is claimed is:

1. A cover for a rigid impermeable container, equipped with a flowed-in cellular resilient peripheral gasket which is the cured product of a composition comprising: (a) a liquid polyurethane prepolymer consisting of a free isocyanate group-containing reaction product of a polyisocyanate compound with a polyhydroxy material substantially composed of polyhydroxy polyether oils; (b) a finely divided polyamine carbamate; and (c) about 10 to 30 percent by weight, based on the polyurethane prepolymer of an acrylonitrile-butadiene rubber having an acrylonitrile content of about 38 to 42 percent.

TABLE IV

SOLVENT EXTRACTION

| Gasket Compound | | Solvent | % Loss After 2 Weeks | % Loss After 4 Weeks |
|---|---|---|---|---|
| Polyurethane – NBR | I | Water | 2.8 | 1.4 |
| SBR Compound | II | Water | 4.2 | 5.9 |
| SBR Compound | III | Water | 1.5 | 1.8 |
| | I | Ethyl Alcohol | 4.2 | 7.7 |
| | II | Ethyl Alcohol | 11.5 | 9.5 |
| | III | Ethyl Alcohol | 11.8 | 12.1 |
| | I | Methylethyl Ketone | 5.7 | 6.2 |
| | II | Methylethyl Ketone | 11.8 | 14.1 |
| | III | Methylethyl Ketone | 12.1 | 12.3 |
| | I | Methylene Chloride | 4.7 | 4.4 |
| | II | Methylene Chloride | 12.2 | 11.3 |
| | III | Methylene Chloride | 11.7 | 11.7 |
| | I | Lacquer Thinner | 1.4 | 2.0 |
| | II | Lacquer Thinner | 10.4 | 9.4 |
| | III | Lacquer Thinner | 10.6 | 11.3 |
| | I | Toluene | 3.1 | 3.3 |
| | II | Toluene | 9.6 | 6.8 |
| | III | Toluene | 10.7 | 16.6 |
| | I | Naphtha | 0.9 | 2.0 |
| | II | Naphtha | 9.3 | 9.4 |
| | III | Naphtha | 10.9 | 11.3 |

Again, the overall superiority of polyurethane gaskets becomes evident.

* * * * *